US011170104B1

(12) United States Patent
Stickle et al.

(10) Patent No.: US 11,170,104 B1
(45) Date of Patent: Nov. 9, 2021

(54) IDENTIFYING ATTACKS ON FILE SYSTEMS

(71) Applicant: Amazon Technologies, Inc., Seattle, WA (US)

(72) Inventors: Thomas Charles Stickle, Saint James, NY (US); Ryan Christopher Holland, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 586 days.

(21) Appl. No.: 14/832,899

(22) Filed: Aug. 21, 2015

(51) Int. Cl.
*G06F 21/56* (2013.01)
*G06N 20/00* (2019.01)

(52) U.S. Cl.
CPC .......... *G06F 21/561* (2013.01); *G06F 21/565* (2013.01); *G06N 20/00* (2019.01); *G06F 2221/034* (2013.01)

(58) Field of Classification Search
CPC ... H04W 12/04; H04L 63/0457; H04L 9/3066
See application file for complete search history.

(56) References Cited

U.S. PATENT DOCUMENTS

| | | | | |
|---|---|---|---|---|
| 8,595,840 B1* | 11/2013 | Malibiran | ............. | G06F 21/554 726/22 |
| 8,856,542 B2* | 10/2014 | Tatarinov | ............. | G06F 21/566 709/224 |
| 9,053,124 B1* | 6/2015 | Dornquast | .......... | H04L 67/1072 |
| 9,292,687 B2* | 3/2016 | Thure | ................... | G06F 21/554 |
| 9,300,676 B2* | 3/2016 | Madhu | ................ | G06Q 50/265 |
| 9,317,686 B1* | 4/2016 | Ye | ........................ | G06F 11/1461 |
| 9,460,284 B1* | 10/2016 | Hajmasan | ............. | G06F 21/566 |
| 9,483,644 B1* | 11/2016 | Paithane | ................ | G06F 21/566 |
| 9,509,690 B2* | 11/2016 | Carter | .................. | H04L 9/0816 |
| 9,514,309 B1* | 12/2016 | Mann | ...................... | G06F 21/60 |
| 2007/0179746 A1* | 8/2007 | Jiang | ..................... | G06F 11/008 702/185 |
| 2013/0031034 A1* | 1/2013 | Gubin | .............. | G06Q 10/06393 706/12 |
| 2013/0159115 A1* | 6/2013 | Adams | ................... | G06N 7/005 705/14.66 |
| 2013/0304677 A1* | 11/2013 | Gupta | .................... | G06N 5/043 706/12 |
| 2014/0379619 A1* | 12/2014 | Permeh | ................ | G06N 99/005 706/12 |
| 2015/0172300 A1* | 6/2015 | Cochenour | .......... | H04L 63/145 726/23 |
| 2016/0078361 A1* | 3/2016 | Brueckner | .......... | G06N 99/005 706/12 |
| 2016/0300156 A1* | 10/2016 | Bowers | ................ | G06N 99/005 |

\* cited by examiner

*Primary Examiner* — Samson B Lemma
*Assistant Examiner* — Abdullah Almamun
(74) *Attorney, Agent, or Firm* — Hogan Lovells US LLP

(57) ABSTRACT

Technology is described for preventing cryptovirus attacks in a computing service environment. Data patterns of both read and write operations are monitored for files during a predetermined time period. The data patterns related to the files are recorded during the monitoring. A machine learning model is constructed according to the recorded data to establish a data change probability for the plurality of files. An unexpected change is detected using the machine learning model according to the data change probability of the files having changed data. A warning notification is sent indicating the unexpected change is detected for the files.

20 Claims, 8 Drawing Sheets

IDENTIFYING ATTACKS ON FILE SYSTEMS

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

These virtual computing systems offer end users unprecedented access to information of many types on a global basis. With the proliferation of wireless communication, users can now access these computer networks from practically anywhere. Connectivity of this magnitude has magnified the impact of computer attacks (e.g., viral and malware attacks). Computer attacks have a devastating impact on computer systems worldwide in terms of costs, productivity loss and data privacy. Given the increasing use of virtualized technology and sharing of physical computing resources amongst multiple customers, the ability to protect virtualized computing and storage resources has also become more valuable.

DETAILED DESCRIPTION

Figure 1:
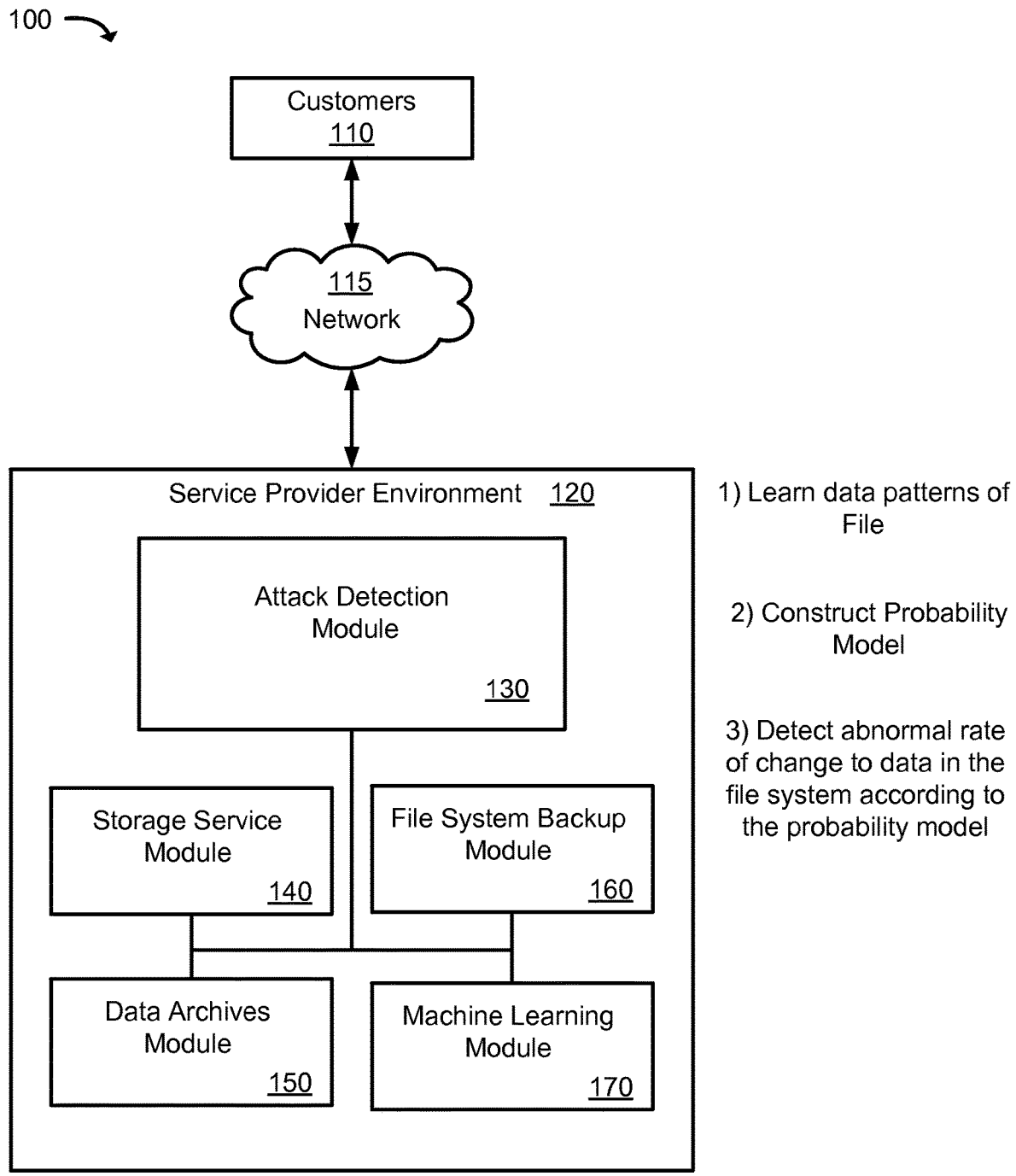
FIG. 1 illustrates a system for identifying and preventing file system attacks in a service provider environment according to an example of the present technology.

In order to combat a file system attack from malicious individuals or software (e.g., a virus, Trojan, ransomware, etc.) a technology is provided for detecting and potentially preventing a file system attack, such as a cryptoviral attack, from propagating to backup file systems in a service provider environment. In one configuration using machine learning, the data patterns of file operations (e.g., both read and write operations) may be monitored during a predetermined time period for files in a file system to collect a set of training data. The data patterns related to the set of training data may be recorded during the monitoring. A machine learning model may be constructed according to the recorded training data to establish a machine learning model that may detect when unexpected changes are occurring with respect to files and file attributes in a file system or backup file system. For example, a regression model may be used in the machine learning model to identify unexpected changes for a group of files.

A current status of data patterns of the file systems may also be monitored for determining if any data files (e.g., documents, images, etc.) have been changed, deleted, and/or otherwise modified on the file system. That is, a current change may be identified based on the changed data for the contents or attributes of files in the file system. Thus, an unexpected change may be detected using the machine learning model for the files or file system during the monitoring. A warning notification may be sent indicating when an unexpected change is detected for the files.

It should be noted that the changed, deleted, and/or otherwise modified data on the file system may be caused by a cryptovirus (e.g., ransomware). A cryptovirus may be a malicious computer virus that uses cryptography to design malicious software. In other words, a cryptovirus may be, for example, a computer virus that contains and uses a public key, and the public key belongs to the author of the compute virus. By using a cryptographic public-key, the public-key cryptography breaks the symmetry between what a malware analyst sees regarding malware and what the malware creator sees. The former sees a public key in the malware whereas the latter sees the public key as well as the corresponding private key since the malware designer created the key pair for the attack. The public key allows the malware to perform trapdoor one-way operations on the victim's computer that only the malware creator can undo. By way of example only, by using the cryptovirus, the cryptovirus encrypts a computer victim's files and the computer victim is required to pay the creator of the malware in order to receive a needed session key (which may be encrypted under the malware creator's public key that is contained in the malware). The session key is needed by the computer victim in order to access any of the files attacked by the malware. That is, the computer victim is held hostage from accessing the computer files until the computer victim pays the malware creator a "fee" in order to receive the session key. Also, it should be noted that other types of cryptography may be used, such as creating an asymmetric back door by stealing private information and/or private keys, may be defined as the cryptovirus.

In one aspect, data patterns of both read and write operations related to one or more files may be learned during a predetermined time period. A machine learning model may be constructed according to the data patterns to enable the machine learning model to identify unexpected changes for the files. An unexpected change may be detected using the machine learning model according to the features submitted for the files having changed data or changed file attributes.

In one aspect, a technology is provided for detecting and/or preventing file system attacks using machine learning within a virtual computing environment having one or more virtual computing resources. More specifically, the technology may detect a cryptoviral attack to stop the attack from propagating to backup file systems in the virtual computing environment or service provider environment. Examples of virtual computing resources may be computing instances, block storage, software machine images, archive storage, logs, NoSQL (No Structured Query Language) data stores, virtualized data stores, virtualized relational databases, virtualized network appliances (e.g., network address translation (NAT), gateways, firewalls), virtual private clouds, and other virtual computing resources. Files may be monitored during a predetermined time period by a machine-learning service for learning data patterns of both read and write operations related to the files when the file system or files being stored into the virtual computing resources are not under attack. The machine-learning service may construct a machine learning model according to the data patterns to enable an output probability for the files as a group (or even for a file individually) and the output probability may represent that an unexpected change is occurring (e.g., an attack is or is not occurring). In one example, the machine-learning service may use a current rate of change for data in the files as an input feature of the machine learning model. Specifically, the reference data or training data may include a probability score or percentage indicating the expected rate of change that may occur to a group of individual files and/or to an entire file system having one or more storage systems, such a networked storage system in a virtual computing environment. In another example, the machine-learning service may use a data change probability generated for each individual file that represents the changed data and the data change probability for individual files may be used as in input to the machine learning model. The machine-learning service may send a warning notification for the group of files (or even an individual file) having the unexpected change or a warning may be sent for the entire customer account in which unexpected changes or unusual changes are detected.

An on-going status of data patterns of the one or more files may also be monitored independent of the learning period. As such, during operation, read and write operations to one or more files may be monitored for identifying features for the one or more files. When those feature are fed into a machine learning model, then one or more output values may be generated. If the output value exceeds a defined threshold than an unexpected change may be identified. Accordingly, a warning may then be issued indicating an attack on one or more files in a file system.

FIG. 1 illustrates a system 100 for identifying and/or preventing file system attacks in a service provider environment as an example of the present technology. The system 100 may include one or more customers 110, a network 115 that is external to the service provider environment 120 (e.g., the internet), and a service provider environment 120 which provides virtualized computing services (i.e., virtualized computing services, virtualized storage services, virtualized networking, etc.) to a customer. The service provider environment 120 may include an attack detection service 130, which may be associated with one or more customers 110. The customers may be sending backup files or other storage data blocks to a file system backup module 160 via the external computing network 115. The network 115 may include the Internet, intranets, extranets, wide area networks (WANs), local area networks (LANs), wired networks, wireless networks, or other suitable networks, etc., or any combination of two or more such networks.

The service provider environment 120 may also include a storage service module 140, a file system backup module 160, a data archives module 150, and a machine learning service 170 and an attack detection service 130, and these operations may be executed and managed by the service provider environment 120. In one aspect, the machine learning service 170 may learn the data patterns of both read and write operations executed by the file system backup module 160. The storage service module 140 and the data archives module 150 may be used to store, retrieve, and/or archive one or more files, storage objects, or file systems where read and write operations may occur. The data patterns related to the files are recorded using the machine learning service 170 during the monitoring. While the term file is use throughout this discussion, the term file may cover data blocks, data entries, data blobs or other units of data that may be stored, backed-up or archived.

The machine learning service 170 may construct a machine learning model 172 according to the recorded data. In addition, a file probability may establish a data change probability for the individual files and the file probability may be used as an input for the machine learning model. The recorded data may be used as training data for establishing predictor functions (e.g., conditions or criteria) for the machine learning model that result in defined output values. Moreover, one or more factors and/or features may be used as input to the machine learning model to establish the output values (e.g., the data change probability). That is, the machine learning module 170 may model one or more factors and/or features relating to one or more data files for determining an output value associated with the files. For example, the output value may be a data change score. The data change score may indicate a probability estimate (e.g., a percentage) of the likelihood that malware is inflicting a damaging change to the files.

Examples of features that may be used as input for the machine learning model may include: a number of blocks changed in a file as compared to the overall file size, total amount of file transfers for the file system in a time period, a number of file opens in a time period, sequential opening of certain file types (e.g., opening many human readable files quickly), watching for AES (advanced encryption standard) encryption usage, a number of files encrypted in a time period, a number of files created in a time period, a number of files deleted in a time period, a total number of files changed in a time period, time since the last file change, and other file and file system features. Each of these features may include values that are translated to a probability that this feature represents an attack. Specifically, 90% of the file blocks in many large files in a file system are changed than 0.8 probability may be provided for that feature for each file.

The attack detection service 130 may detect an unexpected change to files using the machine learning model, created by the machine learning module 170. That is, the attack detection service 130 may include instructions that use the machine learning model for mapping input data or features to a change value or output value that may represent the unexpected change to files.

A warning notification may be sent by the attack detection service 130 indicating that an unexpected change is detected for the files or the file system stored using the storage service module 140 and/or the data archives module 150. A customer 110 may take action, upon receiving a warning notification, in time to stop file transfer or the customer may disregard the warning because of other known operations that are being applied by the file system backup module 160. For example, customer level encryption may be applied at the request of the customer, which may trigger a warning or a false positive that the customer chooses to ignore.

In one aspect, when executed, for example, the machine learning module 170 may monitor the operations on the data files within the service provider environment 120 for a predetermined time period (e.g., two weeks). During the predetermined time period, the machine learning module 170 may determine data points for stored data files during sub-periods (e.g., what occurs to files during 30 minute, 1 hour or 2 hour intervals of time.) The file read and write behaviors identified during the predetermined time period are set as the standard (e.g., average) or "normal change pattern" for the stored data files. The normal change patterns and/or the recorded data patterns may be used to construct a machine learning model to establish what feature input value may result in output values that represent malware is attacking the data files being stored or backed up.

In one specific example, the machine learning model may be driven using the rate of change for the files. The attack detection service 130 may calculate in real time and/or every "X" amount of time (e.g., calculates every hour, every week, every month, etc.) an updated current rate of change, probability score, and/or a current data change percentage for the stored data files. That is the attack detection service 130 calculates what percentage of the data has changed in the stored files. The current rate of change may then be submitted to the machine learning model which has been trained using the normal rate of change from the training set of files. If the percentage of data files having changed data in the stored data files results in the machine learning model detecting that there is a high probability of malware attack, then an output value may be provided to represent that high attack probability, and the attack detection service 130 may report an attack to the files being stored in the service provider environment. The machine learning model may take into account that defined amount of deviation from the normal rate of change may also be used for detecting the attack to the service provider environment (e.g., +/− an nth % from the normal rate of change such as +/−10% from the normal rate of change may be not be considered as an anomaly). Alternatively, a defined threshold above and/or below the normal rate of change may be used for detecting an attack to the service provider environment.

As discussed earlier, this technology may assist in protecting against malicious computer software, such as viruses, computer worms, Trojans, and other malware that present computer security issues. In general, the word "virus" refers to a program or piece of code that is loaded onto a computer without the computer user's knowledge and runs against the user's wishes. Most viruses can also replicate themselves, and the more dangerous types of viruses are capable of transmitting themselves across networks and bypassing security systems. A virus may include malicious code designed to modify software or data accessible by a device. More specific examples of viruses may include without limitation a computer virus, computer worm, computer time bomb, Trojan horse, malware, or other types of program code with similar effect. A virus may be designed to perform any number of malicious acts directed towards information processed by a device or accessible to a device, such as revealing information, damaging information, destroying information, altering information, replacing information, and so forth.

In recent years, a new type of malicious software, often called ransomware, has become widespread. The term ransomware as used herein can refer to one or more malicious programs that block or impede user interaction with a computing operating system. Oftentimes, these programs demand the transfer of funds to the creators or malicious originating parties in exchange for restoration of the computer's operability. Ransomware programs may be considered a variant of Trojan programs, which infect their target computer systems using techniques such as attaching executable files to emails, or attacking a vulnerability in the network service to gain access to the target computer system. This technology protects against ransomware by detecting when the ransomware may be actively attaching file systems that are being backed up and by notifying users about that possible activity. This may result in reducing damage that can be inflicted by such malware.

In example use case scenario, a technology is provided for preventing a file system attack on a primary storage system from propagating to a secondary storage system by using machine learning within a virtual computing environment having one or more virtual computing resources. For example, data patterns of both read and write operations related to one or more files in either the primary storage system and/or the secondary storage system may be learned during a predetermined time period. A machine learning model may be constructed according to the data patterns to enable the machine learning model to identify unexpected changes for the files. For example, assuming ransomware has completely attacked the primary storage system, an unexpected change may be detected using the machine learning model according to the features submitted for the files having changed data and one or more backup operations from the primary storage system to the secondary storage system may be suspended or terminated. As such, the ransomware attack is prevented from propagating to the secondary storage system, which, for example, may a virtual computing storage system.

Figure 2:
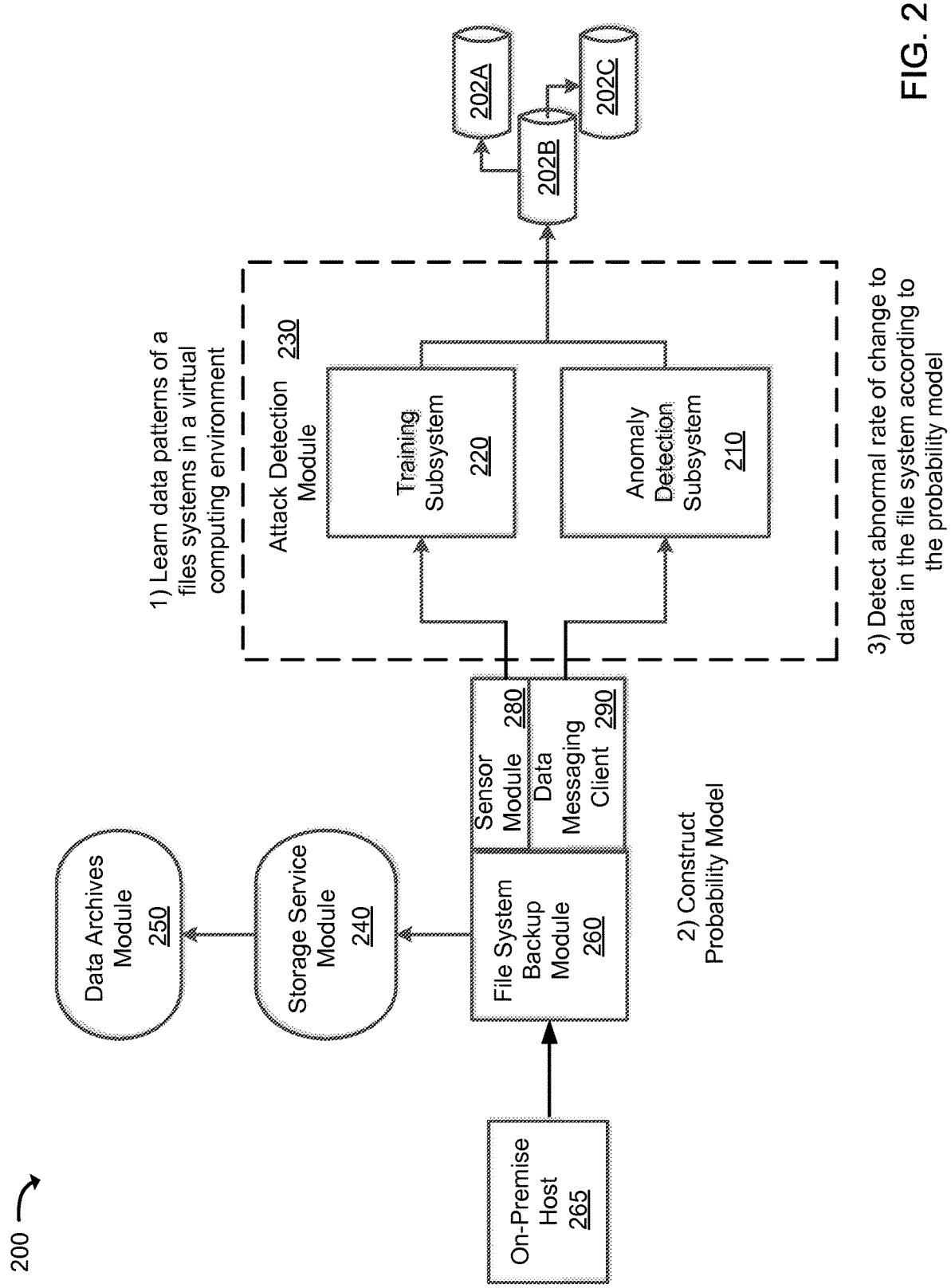
FIG. 2 illustrates a system for identifying and preventing file system attacks from propagating to a backup file system in a service provider environment according to an example of the present technology.

FIG. 2 illustrates a system 200 for identifying and/or potentially preventing file system attacks from propagating to a backup file system using machine learning according to an example of the present technology. In one aspect, the system 200 may be executing on a virtual computing environment that provides virtualized computing, virtualized storage, virtualized networking and other virtualized services that are executing an a hardware substrate.

The system 200 may include an on-premise host 265, a file system backup module 260, a storage service module 240, a data archives module 250, a sensor module 280, a data messaging client 290. The system 200 may also include an attack detection module 230. Within the attack detection module 230, a training subsystem 220 and an anomaly detection subsystem 210 may be included. The system 200 may further include one or more storage file systems, such as distributed data storage file systems 202A, 202B, and 202C.

In one aspect, an on-premise host 265 may be linked to the file system backup module 260 and the on-premise host may send files for backup to the file system backup module 260. Read and write operations for the files to be backed up may be executed by the file system backup module 260. The storage service module 240 and the data archives module 250 may be used to store, retrieve, and/or archive one or more file systems using read and write operations that may be accessed using an API (application programming interface) calls. In one case, the storage service module 240 may be shorter term archival storage and the data archive module 250 may be long term archival storage. The file system backup module 260 may also be directly and/or indirectly connected to and in communication with the sensor module 280, the data messaging client 290, and the storage service module 240.

In one aspect, the data messaging client 290 may collect and process large streams of data records during execution from the file system backup module 260. That is, the data messaging client 290 may take data regarding the features, attributes, or other data points about the files being stored and put the data points into a data messaging stream as messages. The streamed data may be sent to other systems, such as the anomaly detection subsystem 210 and the training subsystem 220. The data messaging client 290 may be used for rapid and continuous data intake and aggregation of data from the file system backup module 260. The type of data may include, but is not limited to file sizes, file blocks being written, files being deleted, file change frequency, aggregate file change rate, file types being stored, and other file storage data features. Because the response time for the data intake and processing is immediate, the processing may be lightweight. The data messaging client 290 may be used to accelerate data feed intake and for immediate reporting of file storage metrics and reporting. For example, the data messaging client 290 may process data at high speed and use multiple applications running in parallel.

More specifically, for example, the data messaging client 290 may provide and/or stream data into the anomaly detection subsystem 210 and the training subsystem 220. In other words, information related to the data or the data itself may be streamed by the data messaging client 290 to both the anomaly detection subsystem 210 and the training subsystem 220. In one aspect, the data streamed by the data messaging client 290 to both the anomaly detection subsystem 210 and the training subsystem 220 may be processed in parallel by each of the anomaly detection subsystem 210 and the training subsystem 220. Alternatively, the data streamed by the data messaging client 290 to both the anomaly detection subsystem 210 and the training subsystem 220 may first be streamed and processed by the training subsystem 220 and/or first by the anomaly detection subsystem 210. Following the processing of the data by the training subsystem 220, the training subsystem 220 may then communicate the data to the detection subsystem 210.

In one aspect, for example, the training subsystem 220 may be working on the same data streamed by the data messaging client 290. The training subsystem 220 may monitor and learn from the data patterns of both read and write operations executed by the file system backup module 260. The monitoring period for recording file storage patterns may need to occur for a significant time period (e.g., one or two weeks) in order to obtain a statistically significant set of data for establishing a machine learning model. The data received and/or transformed by the training subsystem 220 may be stored in one or more of the distributed data storage file systems 202A, 202B, and 202C (e.g., a distributed data warehouse). The training subsystem 220 may construct a machine learning model according to the recorded data for the files. The constructed machine learning model, created by the training subsystem 220, may be used by the anomaly detection subsystem 210 for detecting when an attack is occurring (e.g., using one feature that tracks an unexpected change) on files. In one aspect, the sensor module 280 may determine that an attack is taking place using the output from the machine learning model in the anomaly detection subsystem 210 and the sensor module 280 may report back to the on-premise host 265.

The anomaly detection subsystem 210 may communicate information back to the sensor 280. In other words, the attack detection module 230 may function as part of a feedback loop between the data messaging client 290 and the sensor 280. For example, the attack detection module 230 may detect either normal changes and/or unexpected changes to data or files to a file system and may send a warning (e.g., regarding ransomware) from the attack detection module 230 to the sensor 280.

The sensor 280 may be used to indicate to the file system backup module 260 to continue backing up and/or storing data despite the warning. The backups may also be made with versioning turned on if there is a potential problem. This file versioning may continue until it has been determined that the threat of an attack has passed. If an attack is confirmed, then the previous versions of the files may be used to replace any corrupted or encrypted files.

Alternatively, the sensor 280 may be used to indicate to the file system backup module 260 to cease the operations of backing up and/or storing data according to the received warning. Also, the sensor 280 may be used to indicate to the file system backup module 260 to send a notification (e.g., a permissions request) to a user requesting permission to continue backing up and/or storing data prior upon an indication from the attack detection module 230 that unexpected changes may be detected by the attack detection module 230 using the machine learning model, created by the machine learning service 170, according to the changing features of the files being backed up. Further, a request for a two factor acknowledgement (2FA) may be prompted for and issued prior to a user continuing any further read operation and/or write operation to the distributed files system 304. That is, a two-factor authorization (2FA) is used, using the machine learning system 370, to establish a user identity for continuing with read operations and/or write operations for the plurality of files following detection of the unexpected changes using the machine learning model.

For example, the attack detection module 230 may provide feedback to the sensor 280 by issuing the warning notification to the sensor 280 indicating that unexpected changes are detected for the one or more files, which may be stored using the storage service module 240 and/or the data archives module 250. In other words, the data messaging client 290, the training subsystem 220, the sensor module 280, and the attack detection module 230 function as a feedback loop for the file system backup module 260. As such, the attack detection module 230, using the training subsystem 220 and the anomaly detection subsystem 210 may learn the data patterns of both read and write operations (and any other file operations) related to files during a predetermined time period. The attack detection module 230 may construct a machine learning model according to the defined features for the files to identify unexpected data changes for the plurality of files. The attack detection module 230 may also detect the unexpected changes using the machine learning model according to the data change probability for individual files. The distributed data storage systems 202A, 202B, and 202C are used to store the information and data related to the files and data being processed through the anomaly detection subsystem 210 and the training subsystem 220, collectively the attack detection module 230. The distributed data storage systems 202A, 202B, and 202C may optionally store the machine learning model(s).

For example, in one aspect, the attack detection module 230 may apply the machine learning model or an anomaly detection algorithm to currently monitored file data, such as, the data being streamed from the data messaging client 290 to determine an output value (e.g., a probability) that the streamed data being unexpectedly changed or removed. In one aspect, achieving a low probability of unexpectedly changed data or a high probability of unexpectedly changed data as compared to a reference data change probability (established during training phase of the machine learning model) may indicate an anomaly in a file system. For example, if 15 documents in a file system are updated with an unexpected data change probability of 75% and then suddenly the 15 documents are removed; the removal of the 15 documents may qualify as an anomaly. If, on the other hand, the 15 documents have a low rate of unexpected data change probability (e.g., less than 10% chance of unexpected change), and then during a current monitoring of the 15 documents an updated calculation of the rate of change to the 15 documents indicates the 15 data files have a 95% change rate (e.g., 95% of the 15 documents have been unexpectedly changed, alternated, removed, set modification flags, and/or are measured to have different file sizes) the anomaly detection subsystem 210 would send an alarm to the file system backup module 260 indicating an anomaly and there is an attack on the file system.

As previously mentioned, one or more factors and/or features may be used as features or inputs to the machine learning model to establish the output values (e.g., the data change probability). That is, the machine learning module may include one or more factors and/or features relating to one or more data files for determining a data change score or output value associated with the files. The data change score may indicate a probability estimate (e.g., a percentage) of the likelihood that malware is inflicting a damaging change is occurring to the files. Hence, turning now to FIG. 3, an example is provided for use to indicate both a data change probability rate as well as the actual number of times a file has been accessed for a read operation and/or a write operation for determining data patterns and data change rates or the data change probability.

Machine learning may be an effective tool for use in detecting an attack on a file system. Machine learning may be useful as a method that takes input empirical data, such as data from historical usage patterns of the file system, and yields patterns or predictions which may be representative of the underlying mechanism or process that resulted in the generation of the data (e.g., an attack on the file system vs. common file system use). Machine learning systems may take advantage of data to capture characteristics of interest having an unknown underlying probability distribution. Machine learning may be used to identify possible relations between observed variables, such file operations or file attributes. Machine learning in the disclosed technology may also be used to recognize complex attack patterns and make intelligent decisions based on input data. In some examples, machine learning systems may generalize from the available data to produce a useful output, such as when the amount of available data is too large to be used efficiently or practically. As applied to the present technology, machine learning may be used to identify pattern of attack on a file system.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

Figure 3:
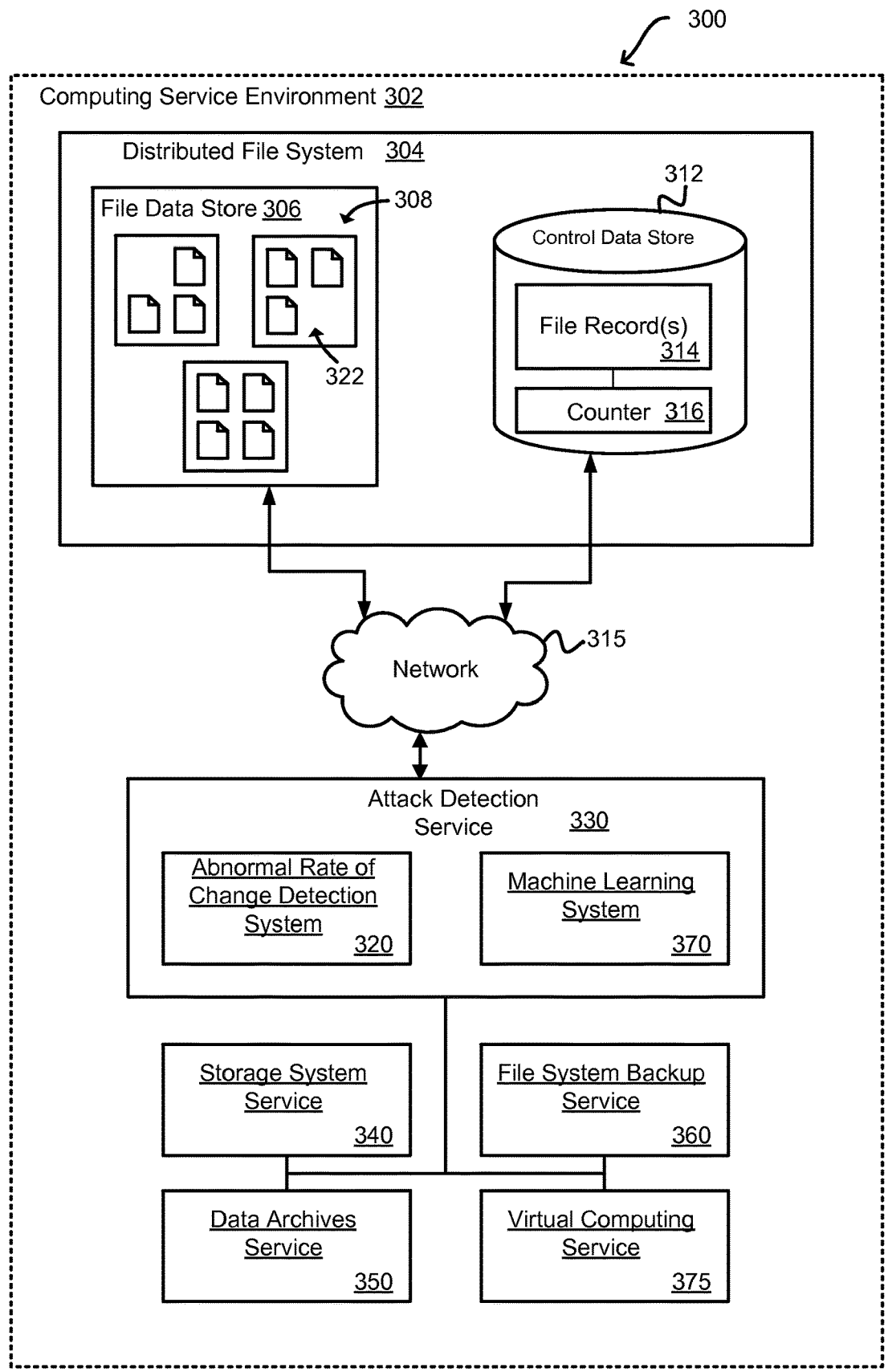
FIG. 3 illustrates a system for identifying and preventing file system attacks in a computing service environment according to an example of the present technology.

FIG. 3 illustrates a system 300 for preventing file system attacks in a computing service environment according to an example of the present technology. The system 300 may include a computing service environment 302. The computing service environment 302 may include a distributed file system 304, a virtual network 315, an attack detection service 330, a storage system service 340, a data archives service 350, a file system backup service 360, and a virtual computing service 375. The attack detection service 330 may include a machine learning system 370 and an unexpected change detection system 320.

As illustrated, the distributed file system 304 may include a file data store 306 and a control data store 312. The control data store 312 may be a key-value data store that is a computing service in a computing service environment 302 used to store file records 314 that are associated with files 322 stored on the file data store 306. The control data store 312 may also include a counter 316 that is associated with the file records 314 and/or the files 322. The file records 314 may include: a file identifier used to identify a file 322 on the file data store 306, a file name that identifies a file 322 to a user, fields used to lock access to a file 322, as well as other metadata fields for the file 322. The file data store 306 may be an object storage service in the computing service environment 302 that stores files 222 as objects within object stores 308 (e.g., buckets or file directories). A file 322 may be any type of data file (e.g., a text file, word processor file, slide presentation file, spreadsheet file, image file, audio file, video file, executable file, binary file, blob or other file type that may be owned by or shared within a computing service environment 302.

The file record 314 may also include fields used to indicate both a data change probability rate as well as the actual number of times a file has been accessed for a read operation and/or a write operation for determining data patterns and data change rates or the data change probability. For example, the file record 314 may include a file record ID associated with each file 322 and in communication with the counter 316, which may be set to a starting value (e.g., "0"). As an illustration, the file counter 316 of the file records 314, which may be associated with the files 322, may be initially set to the starting value a "0". Thereafter, each read operation and/or the write operation may incrementally increase and/or decrease by an interval value (e.g., "1", "2", "3", etc.) of the counter 316 which may, for example, represent a number of times one or more file has been accessed and/or has had data changed via the read operation and/or the write operation. It should be noted that the counter may be used to count a number of data blocks within a file, a number of changed data blocks within a file, data change rates, time intervals, increases and/or decreases in file change interval values, and/or other factors or features capable of being measured or tracked. For example, the counter may count (using one or more equations for adding, subtracting, multiplying, dividing, and/or other mathematical equations commonly used in the art) one or more time intervals over a predetermined time period. Alternatively, in another example, the counter may also count a number of data blocks within a file and a total number of data blocks having changed data over a predetermined time interval. Such examples are provided for illustration purposes and should not be construed as limiting.

The attack detection service, via a virtual network 315, may monitor the data storage patterns of each file 322 within the file data store 306 and may simultaneously receive update count information for the file records 314 for each file 322 in the file data store 306. During a predetermined period of time (e.g., a two week time period), the machine learning system 370 may learn and record data patterns associated with files 322 in the distributed file system 304. Using the data patterns of each read and write operation that are recorded and measured using the counter 316 of the control data store 312, a standardized (e.g., normal) rate of change of data may be determined.

In one aspect, the machine learning module 370 learns and records the data patterns of both read and write operations executed by the file system backup module 360 for one or more of the files 322 in the distributed file system 304, which may utilize the computing service environment 302. The storage service system 340 and the data archives services 350 may be used to store, retrieve, and/or archive one or more the files 322 in the distributed file system 304 where read and write operations may occur.

Data patterns for read and/or write operations related to one or more files 322 may be recorded using the machine learning module 370 during a monitoring operation of the distributed file system 304 during a predetermined time period. A machine learning model may be constructed by the machine learning module 370 according to the recorded data to establish a data change probability for the files. That is, a normal rate of change of the data in the distributed file system 304 may be learned using a reference set of data that is analyzed by the machine learning system 370 within the computing service environment 302, such as a virtual computing system, to understand normal data patterns for each read and write operation during the predetermined time period. For example, during the monitoring, a rate of change (e.g., a rate of change expected for a data file) for the distributed file system 304 may be determined to have a rate of change of 25% (e.g., the probability that the data will change is at or near 25%).

The machine learning system 370 may then construct a machine learning model for the file data store 306 that can be used to assess probabilities for data change (e.g., data rate change probability). An unexpected change detection system 320 may continuously calculate, in real time, a current rate of change of data to the files 322. For example, the counter may count the number of data blocks in a file that have changed data. The amount of changed data blocks may be measured and calculated over one or more time intervals during monitoring time period to calculate the current rate of change. As such, the currently calculated rate of change of data may be compared to the previously calculated normal rate of changed determined by the machine learning system 370 for comparison. If the currently calculated rate of change of data is greater than the normal rate of change of data, the currently calculated rate of change of data to the files 322 may be determined as an unexpected change of data indicating a potential file system attack, such as a ransomware attack, to the distributed file system 304.

Upon detection of the unexpected change to data to the distributed file system 304, the file system backup service 360 may issue a warning in the computing service environment 302. That is, the detection of the unexpected change of data to the distributed file system 304 by the unexpected change detection system 320 may cause the file system backup service 360 to provide an indication of a positive detection of ransomware executing in the computing service environment 302 in response to unexpected change in the data analysis.

It should be noted that certain processing modules may be discussed in connection with this technology and FIGS. 1-3. In one example configuration, a module or service of FIG. 2 or 3 may be considered a service with one or more processes executing on a server or other computer hardware. Such services may be centrally hosted functionality or a service application that may receive requests and provide output to other services or user devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 4:
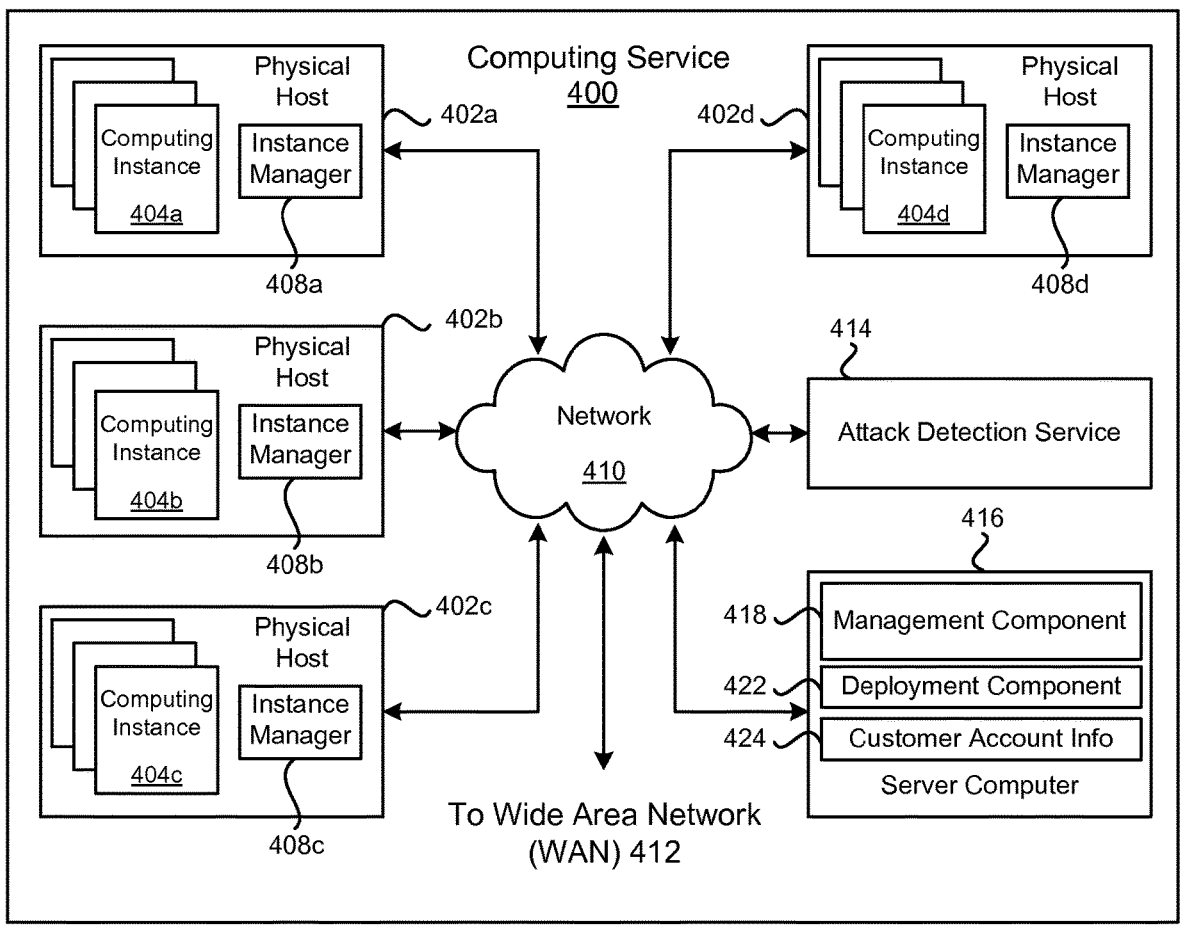
FIG. 4 is a block diagram that illustrates an example computing service environment that includes an attack detection service.

FIG. 4 is a block diagram illustrating an example computing service 400 that may be used to execute software services in association with an attack detection service for preventing file system attacks in a computing service environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for executing an attack detection service. For example, a server computer 414 may execute an attack detection service for preventing file system attacks in a computing service environment.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multitenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
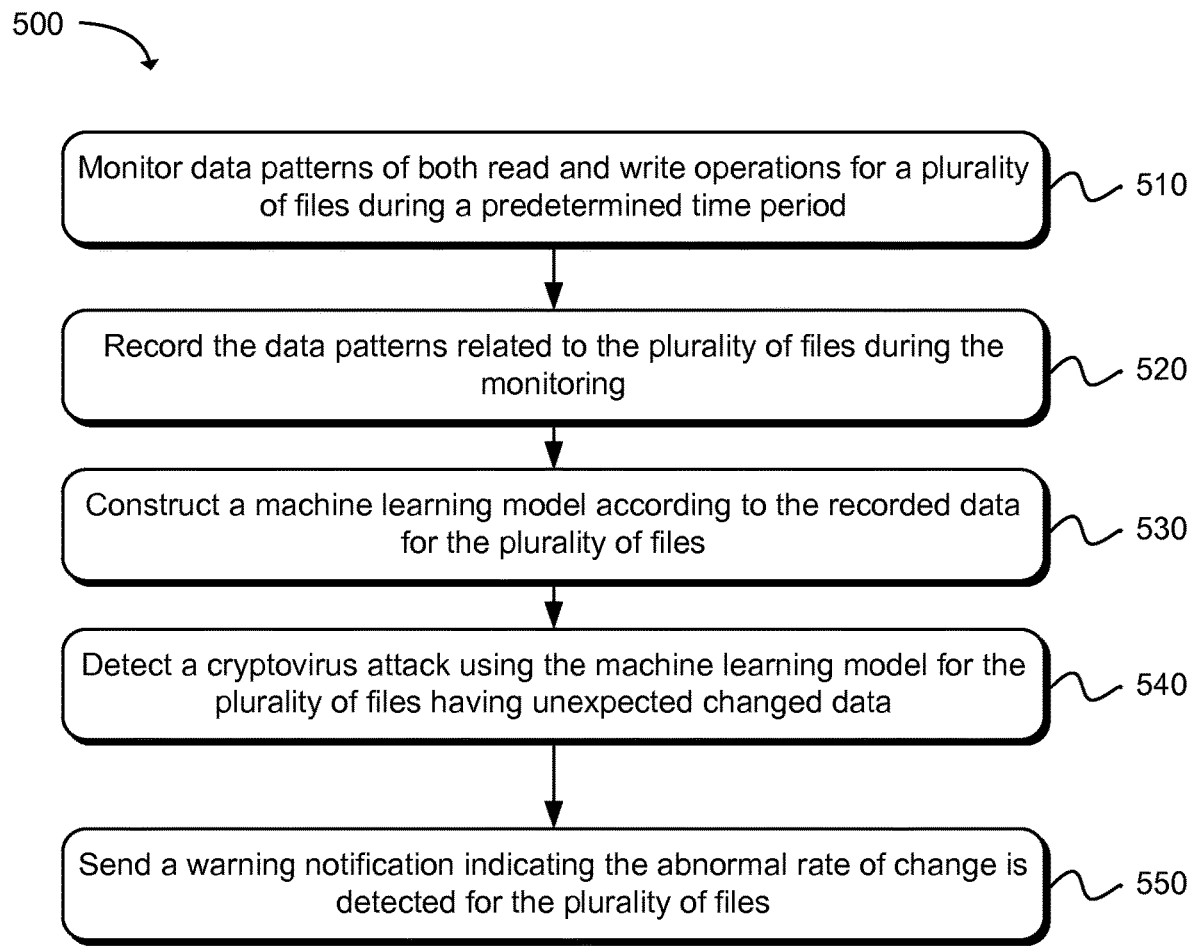
FIG. 5 is a flowchart of an example method for identifying and preventing file system attacks in a service provider environment according to an example of the present technology.

Moving now to FIG. 5, a flow diagram illustrates an example method 500 for identifying and preventing file system attacks in a service provider environment. The functionality may be implemented as a method and executed as instructions on a machine, where the instructions are included on at least one computer readable medium or one non-transitory machine-readable storage medium. For example, starting in block 510, data patterns of both read and write operations may be monitored for files during a predetermined time period.

The data patterns related to the files are recorded during the monitoring, as in block 520. As in block 530, a machine learning model may be constructed according to the recorded data to establish a data change probability for the plurality of files. Unexpected changes (caused by a cryptovirus attack) may be detected using the machine learning model according to the data change probability of the files having changed data, as in block 540. As in block 550, a warning notification may be sent indicating the unexpected change is detected for the files.

Figure 6:
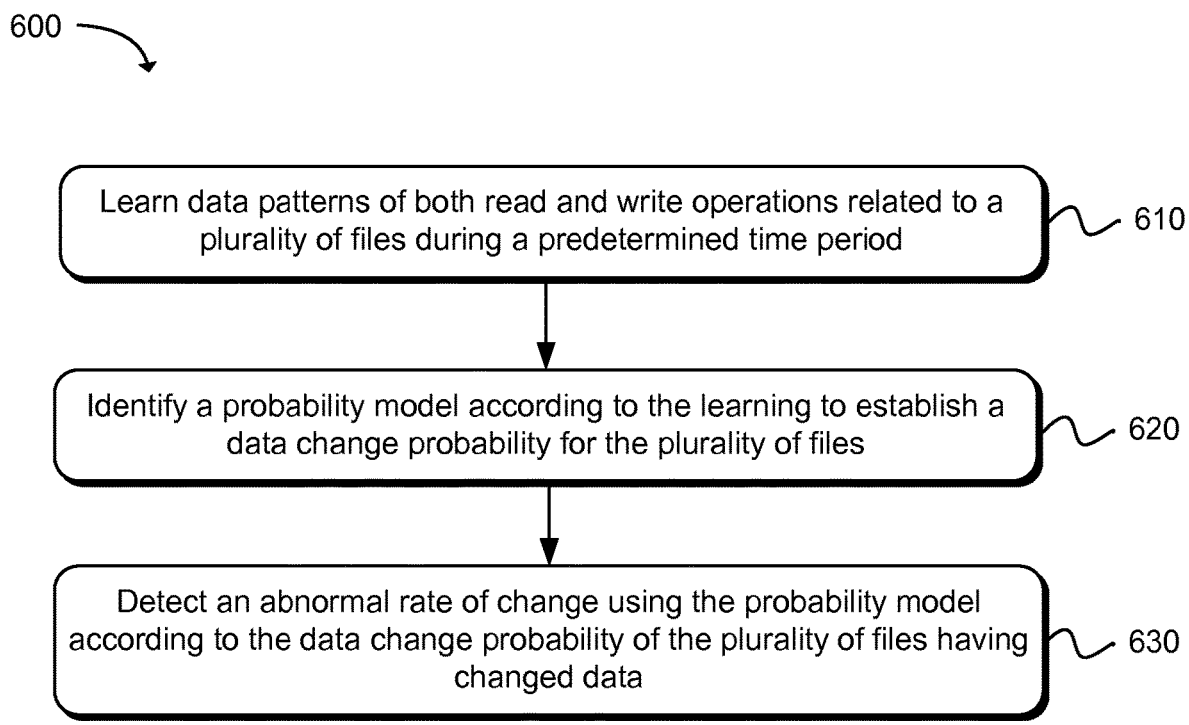
FIG. 6 is a flowchart of an example method for identifying and preventing file system attacks using machine learning within a computing service environment according to an example of the present technology.

Turning now to FIG. 6, a flow diagram illustrates an example method 600 for a identifying and/or preventing file system attacks using machine learning within a computing service environment. The functionality may be implemented as a method executed as instructions on a machine, where the instructions are included on at least one computer readable medium or one non-transitory machine-readable storage medium. Starting in block 610, data patterns of both read and write operations related to one or more files may be learned during a predetermined time period.

As in block 620, a machine learning model may be identified (and/or constructed) according to the training provided by the data patterns to test for unexpected data changes for the files. As in block 630, an unexpected change (caused by a cryptovirus attack) may be detected using the machine learning model according to the data change probability of the plurality of files having changed data.

Figure 7:
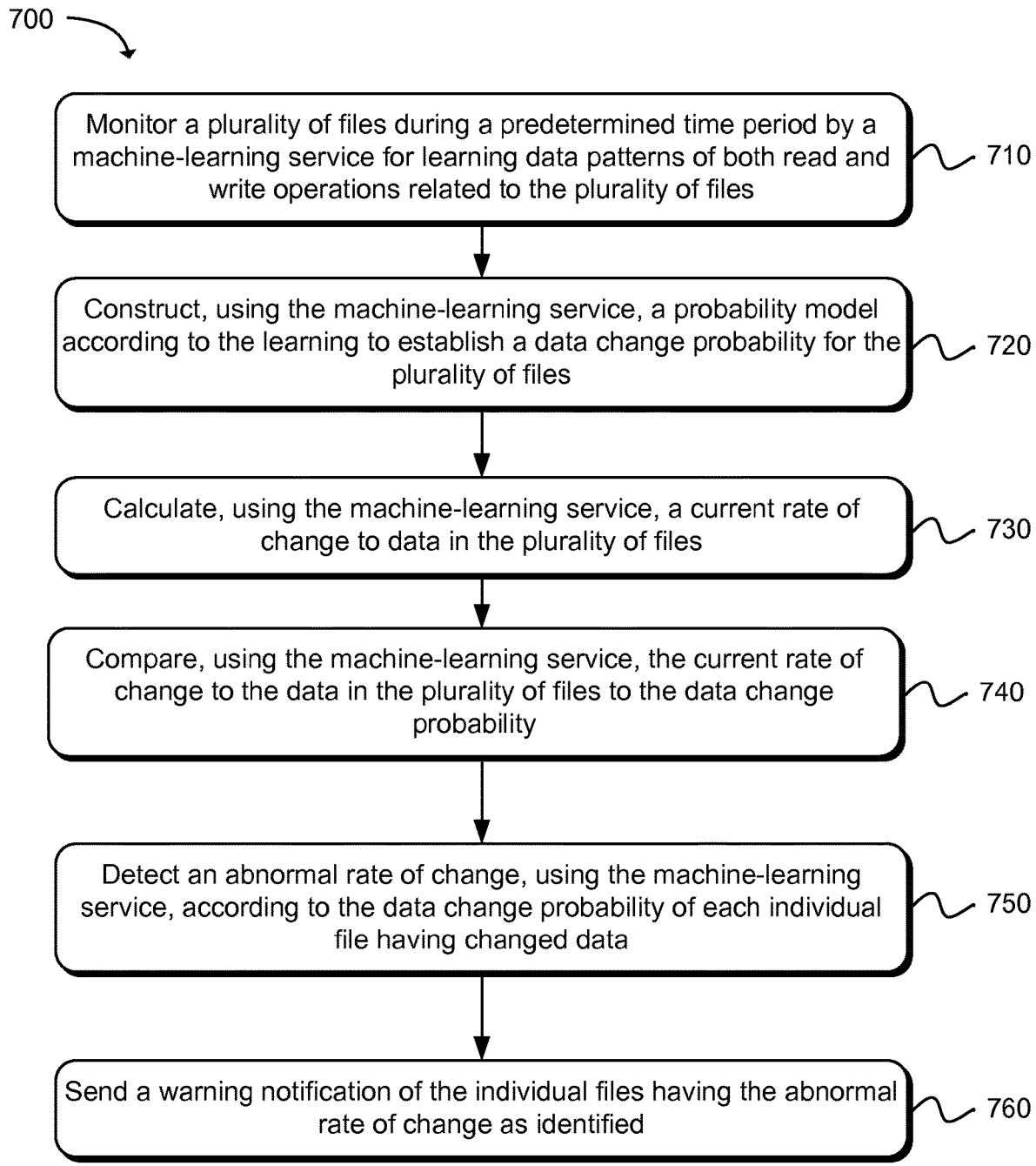
FIG. 7 is a flowchart of an additional example method for identifying and preventing file system attacks using machine learning in a service provider environment according to an example of the present technology.

Moving now to FIG. 7, a flow diagram illustrates an example method 700 for identifying or preventing file system attacks using machine learning in a service provider environment. Starting in block 710, files (e.g., such as files in a virtual computing environment) may be monitored during a predetermined time period by a machine-learning service for learning data patterns of both read and write operations related to the files. The files may be associated with virtual computing resources that may include computing instances, computing service images, networking resources, storage resources, and/or a combination thereof. Also, the files may also be associated with both a primary storage system and/or a secondary storage system. The secondary storage system may be a storage system within a virtual computing environment. As in block 720, a machine-learning service may construct a machine learning model according to the training data. The machine-learning service may be used to identify an unexpected change (caused by a cryptovirus attack) to the files or to the data in the files, as in block 730. In one aspect, the training data may be modeled from data from either the primary storage system and/or the secondary storage system. In another aspect, the training data may be monitored from the primary storage system. In either aspect, the machine-learning service may be used to identify an unexpected change to the files or to the data in the files that may be stored on the primary storage system (e.g., a laptop) and/or on the secondary storage system (e.g., a storage system within a virtual computing environment).

As in block 740, the machine learning model may compare the current rate of change to the data in the files to the data change probability. As in block 750, the machine learning may be used to detect an unexpected rate of change (e.g., the unexpected rate of changed caused by a cryptovirus) according to the data change probability of each individual file having changes (e.g., changed data caused by a cryptovirus). Upon detecting the unexpected change(s) using the machine learning model, the read operation or the write operation for the files may be suspended or even terminated. For example, assuming the primary storage system has been subject to an attack by ransomware, the unexpected change(s) detected using the machine learning model may suspend or terminate any further read operation or the write operation for the files on the secondary storage system. In this way, the ransomware is prevented from propagating to the secondary storage system.

Also, an identity authentication request may issue to an identified owner of the files for continuing with a read operation and a write operation for the files following the detecting the unexpected change(s) using the machine learning model.

The machine-learning service sends a warning notification of the individual files having the unexpected change as identified, as in block 760.

Figure 8:
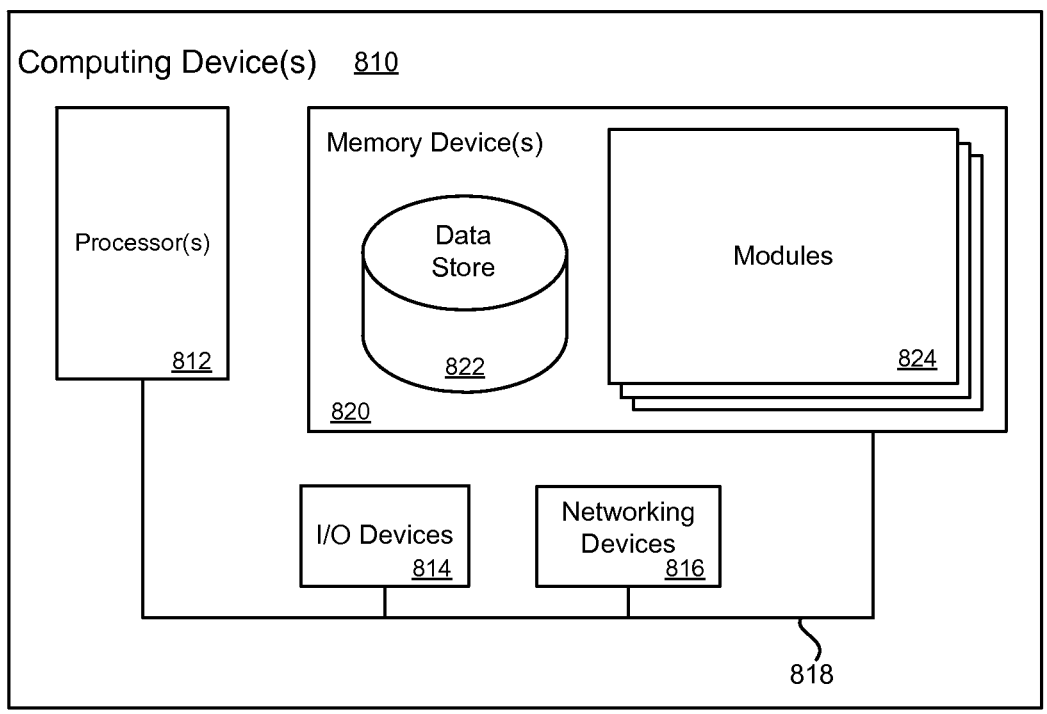
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for preventing malicious attacks on file storage systems, wherein the method comprises:
    under control of at least one processor and memory, executing instructions that:
    monitor data patterns of both read and write operations for a plurality of files during a predetermined time period, using the at least one processor and memory;
    record the data patterns related to the plurality of files during the monitoring, using the at least one processor and memory;
    construct a machine learning model according to the recorded data patterns of both read and write operations for the plurality of files, wherein the recorded data patterns used to construct the machine learning model identify an expected rate of changed data for the plurality of files, using the at least one processor and memory;
    detect a cryptovirus attack using the machine learning model for the plurality of files having unexpected changed data as compared to the expected rate of changed data, as indicated by the machine learning model, using the at least one processor and memory; and
    send a warning notification indicating the unexpected change is detected for the plurality of files, using the at least one processor and memory.

2. The method of claim 1, wherein the executable instructions further terminate the read and write operations for the plurality of files upon detecting the unexpected change using the machine learning model, using the at least one processor and memory.

3. The method of claim 1, wherein executable instructions further issue a permissions request to an identified user for continuing with at least one of a read operation or a write operation for the plurality of files following detecting the unexpected change using the machine learning model.

4. A computer-implemented method, comprising:
    under control of at least one processor and memory, executing instructions that:
    record data patterns of file operations related to a plurality of files during a predetermined time period, wherein the data patterns are of both read and write operations for the plurality of files, using the at least one processor and memory;
    identify a machine learning model according to the data patterns of file operations for the plurality of files, wherein the data patterns used to construct the machine learning model identify an expected rate of changed data for the plurality of files, using the at least one processor and memory; and detect an unexpected change, as compared to the expected rate of changed data, caused by a cryptovirus attack using the machine learning model according to the plurality of files having changed data, using the at least one processor and memory.

5. The method of claim 4, wherein the executable instructions further terminate a read operation or a write operation for the plurality of files upon detecting the unexpected change using the machine learning model and the at least one processor and memory.

6. The method of claim 4, wherein the executable instructions further issue an identity authentication request to a user of the plurality of files for continuing with one of a read operation or a write operation for the plurality of files following the detecting the unexpected change using the machine learning model.

7. The method of claim 4, wherein the executable instructions further calculate a current rate of change to data in the plurality of files.

8. The method of claim 7, wherein the executable instructions further use the current rate of data change of the plurality of files for detecting the unexpected change using the machine learning model.

9. The method of claim 8, further comprising executable instructions that use a plurality of features that are provided to the machine learning model to identify the unexpected change.

10. The method of claim 8, wherein the plurality of files are stored in a virtual computing environment.

11. The method of claim 4, wherein the executable instructions use a statistical regression model in the machine learning model to establish an unexpected change.

12. The method of claim 4, further comprising executable instructions that record the data patterns related to the plurality of files to provide training data, using the at least one processor and memory.

13. The method of claim 12, further comprising executable instructions that use the recorded data as training data to assist in creating the machine learning model to identify unexpected changes.

14. The method of claim 4, wherein the plurality of files are stored in a primary storage system and a secondary storage system, wherein the secondary storage system is a storage system within a computing environment.

15. A method for preventing cryptoviral attacks within a virtual computing environment, wherein the method comprises:

under control of at least one processor and memory, executing instructions that:

monitor a plurality of files during a predetermined time period for training data patterns of both read and write operations related to the plurality of files, using the at least one processor and memory;

construct a machine learning model according to the training data patterns of both read and write operations related to the plurality of files, wherein the training data patterns used to construct the machine learning model identify an expected rate of changed data for the plurality of files, using the at least one processor and memory;

detect an unexpected change, as compared to the expected rate of changed data, caused by a cryptovirus attack using the machine-learning model, using the at least one processor and memory; and send a warning notification regarding the files having the unexpected change as identified, using the at least one processor and memory.

16. The method of claim 15, further comprising executable instructions that terminate a read operation or a write operation for the plurality of files upon detecting the unexpected change using the machine learning model, using the at least one processor and memory.

17. The method of claim 15, further comprising executable instructions that issue a two-factor authorization (2FA) to establish a user identity before continuing with one of a read operation and a write operation for the plurality of files following detection of the unexpected change using the machine learning model.

18. The method of claim 15, further comprising executable instructions that use a statistical regression model in the machine learning model to establish unexpected change.

19. The method of claim 15, further comprising executable instructions that use the data that is recorded during a pre-defined time period as training data for creating the machine learning model to establish unexpected change.

20. The method of claim 15, further comprising executable instructions that use a plurality of features of the data for the plurality of files during training to assist in creating the machine learning model to establish unexpected change.

* * * * *